Aug. 16, 1927.
G. W. WALLACE
1,639,356
PROCESS OF MAKING ACTIVATED CARBON
Filed Jan. 13, 1926
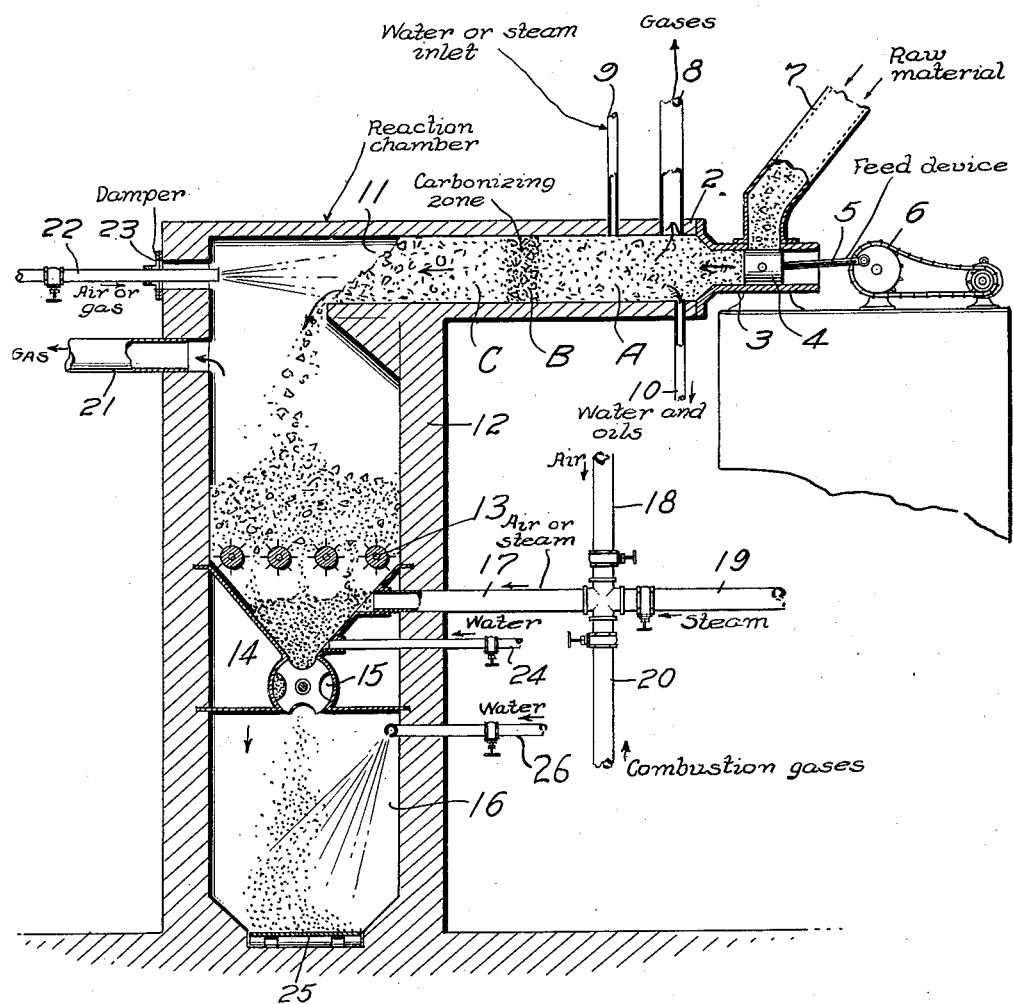
Inventor
GEORGE W. WALLACE,
By K. P. McElroy
Attorney Patented Aug. 16, 1927.

1,639,356

UNITED STATES PATENT OFFICE.

GEORGE W. WALLACE, OF SAN FRANCISCO, CALIFORNIA.

PROCESS OF MAKING ACTIVATED CARBON.

Application filed January 13, 1926. Serial No. 81,120.

This invention relates to processes of making activated carbon; and it comprises a method of producing activated carbon from organic or carbonaceous material, wherein a short, pervious, moving, usually horizontal column of organic material to be carbonized is established and maintained, the said column being maintained with one end relatively hot and the other end relatively cool and a certain type of temperature gradient therebetween, material to be carbonized being fed in at the relatively cool end and a gas flame being established and maintained near the hot end with removal of products of combustion, etc. at the cool end, conditions being so correlated and arranged that a relatively stationary zone of carbonization is established and maintained in said moving column at a point intermediate the ends, and the material emerging from the hot end is subjected to mild or partial oxidation, cooled and quenched; all as more fully hereinafter set forth and as claimed.

In the manufacture of activated carbon for various purposes the conditions necessary are tolerably well known but it is difficult to observe these conditions in any simple and economical method utilizing ordinary types of apparatus. It is the purpose of this invention to provide such a simple and economical method. The usual materials for producing activated carbon are fruit pits, such as apricot pits, peach pits, etc., nut shells, such as cocoanut shell, lignite, sawdust, etc. These materials may be here used. Sometimes the materials used are mixed with lime or limestone, etc.; the final product being washed with acid to remove these additions. These additions may be here used also.

In carbonization of any vegetable material, the carbonization reaction per se is usually exothermic; the breaking down of the vegetable tissue liberates enough heat to maintain the action. In practice, of course, vaporization of water, radiation losses, etc. may dissipate enough heat to necessitate the use of heating means. In carbonization, cellulose breaks down to a carbon skeleton or charcoal with liberation of various vapors and gases. Tar and similar heavy vapors are always produced. The surfaces of the charcoal are always more or less charged with products derived from these vapors; and if the heating is forced, as is usually the case in making charcoal, secondary decomposition of the primary gases and vapors occurs with deposition of more carbon; this secondary carbon being deposited in the pores and clogging them. Apart from its clogging action on the pores, this secondary carbon is more or less objectionable for other reasons. It is usually inactive and may be more or less graphitic.

In the present invention conditions are so arranged as to make the carbonization, as nearly as may be, a simple phenomenon; the materials being dried and preheated and moved to a point of high temperature where carbonization sets in. Evolved vapors and gases are swept forward along the line of moving material against the line of movement, preheating and drying it. At no point however, except in the actual carbonization zone, is the temperature high enough to produce secondary decomposition. I establish a stationary zone of carbonization in a moving column of pervious material. Very often the material fed into the column is moist and I may purposely moisten it when it is not, or supply further moisture. Much depends on the particular material. If carbonization is vigorously exothermic, cold or wet materials are desirable at the feed end. Otherwise it may at times be desirable to use a little preheat; as for example in furnishing warm materials coming directly from a drier or the like. I desire to establish a sharply declining temperature gradient between the carbonizing zone and the point of feed; and the presence of moisture at the feed end sometimes aids in this with materials developing considerable heat in carbonization and furnishing large volumes of hot gases and vapors.

The material in the carbonization zone quickly undergoes whatever reactions are possible and moves beyond it. Because of the quickness of action the carbonization zone is relatively short. Moving beyond the carbonization zone the material passes to an end face from which it falls or is removed. Against this face I apply flame gases at any convenient flame temperature. The flame gases whatever their temperature in entering the pervious carbon face of the moving column are quickly dropped in temperature to a rather fixed point between 1400 and 1600° F. by the endothermic action of reducing $CO_2$ to $CO$ and $H_2O$ to $H$ (the "water gas reaction"). It is best to so proportion the air supply as to give a flame of slightly reducing nature. By the use of flame impinging against the discharge face several advantageous results are gained. One is that the discharged materials are superheated to a high temperature which facilitates the next operation of cleaning out the carbon; and another is that the endothermic actions result in establishment of a constant temperature plane just beyond the face. This aids in maintaining a fixed temperature gradient of the type desired in the advancing column of material. It is disadvantageous to have the carbonization zone shift back and forth to any extent. The best results are obtained with a zone of fixed location.

As so far described I have produced carbon with open and unclogged pores practically free of secondary carbon. This carbon however needs limited oxidation to free its surfaces of adsorbed matters. To some extent this is accomplished by the water gas reaction referred to but not sufficiently for practical purposes. The superheated materials discharged from the flame heated face of the stated column I therefore drop in such manner as to form a relatively deep bed or layer in a chamber which is maintained at a high temperature and there subject them to limited oxidation by a draft current containing steam or products of combustion or both. As oxidation by these bodies is an endothermic action, the preheat given by the flame is useful. Temperatures in the mass or accumulation subjected to the "cleaning out" or "mild oxidation" treatment may be maintained by radiation from the stated flame and from the chamber walls, but usually heat from this source is reinforced by the action of some air in the draft current passing through the hot material. The amount of air is often merely that necessary to furnish heat sufficient to balance radiation losses and the endothermic action of the draft current. Within limits, any desired temperature may be maintained in the mass of balancing the heat evolved by air against the heat-dissipating actions. After oxidizing, the cleaned out material may be cooled and quenched in any ordinary way; being afterwards extracted with acid. If limestone or other basic materials have been used or are present in the carbonized residue they are removed by this acid treatment.

In the accompanying drawing I have shown, more or less diagrammatically, certain apparatus adapted for use in the described process.

The showing is a vertical section of a simple apparatus, certain elements being shown in elevation.

In this showing, element 1 indicates as a whole the reaction chamber. It is relatively short, ordinarily not having a length exceeding three or four times the diameter. In handling one particular peat with an 18-inch cylindrical reaction chamber all the actions I desire were accomplished within the length of 32 inches; sometimes within a length of 24 inches. The chamber may be made of brick or metal or of brick lined metal. One end, 2, is the cold end and communicates with a forced feed device; shown as a sort of plunger feed 3, by which successive "plugs" of material are forced in by plunger 4, activated by 5 and 6. Raw material is supplied through conduit 7. From the reaction chamber gases and vapors are taken off by 8 and sent to suitable condensing means not shown. Usually 8 is placed under suction by suitable means not shown. Liquid condensed products (mostly water) are removed from the reaction chamber by drain 10. In carbonizing most of the materials mentioned, considerable amounts of condensible byproducts are formed. Sometimes it is worth while recovering them; sometimes not; this usually depending on the scale of operation. High boiling products, like tars and heavy oils will condense and be removed with the water by drain 10. More volatile oils go forward with the gases from which they can be recovered by chilling and scrubbing. If desirable in maintaining this end of the apparatus cool, water or steam may be introduced through inlet 9. Within the chamber the moving charge may be regarded as passing through three zones which I have marked A, B and C. At the feed end, zone A is usually but not necessarily at some temperature below 212° F. Zone B is the carbonizing zone and really sets its own temperature; this temperature being a balance between the heat evolved in carbonization and heat losses by radiation, heating up admixed mineral matter, etc. Often this carbonizing zone is at a temperature around 800° F. Beyond the carbonization zone is zone C in which there is a temperature rise beginning a little beyond B. At the exposed face the passing material is at or near the temperature of the flame gases used in heating; and just within this face is a zone at a reduced temperature; the temperature set by the "water gas reaction"—the endothermic reduction of $CO_2$ and $H_2O$ by C. As shown, the material at the end C has an angle of repose face. Beyond the open end 11 of conduit 1 the hot material falls into an accumulation or bed in vertical chamber 12. Within this chamber is a grate 13 below which is a coned chamber 14 with a star feed discharge device 15. From 15 carbonized material drops into a closed chamber or pit 16 provided with means for spraying water 26. Within the chamber 12 may be introduced various draft currents. As shown I have provided inlet pipe 17 entering the chamber at a point below the grate. Through this pipe may be supplied air, steam or products of combustion or any mixtures thereof. As shown branch pipes 18, 19 and 20 are provided for this purpose. From the chamber 12 such gas as does not pass through reaction chamber 1 may be removed by outlet pipe 21. Sometimes there is more combustible gas furnished in cleaning out the carbonized material than is needed to furnish heat in carbonization, and the excess may be collected and otherwise used; as may the gas coming from the carbonization zone. Sometimes however the amount of gas is not more than is needed to furnish heat for the impinging flame and sometimes it is less. The less "cleaning out" is necessary, the less is the production of gas and the less is the loss of material. Where material discharged from face 11 is fairly free of adsorbed matters, but little cleaning out may be necessary in chamber 12 and there is but little production of gas. This means greater yields. Within limits the more accurate the control of conditions in the carbonizing zone and of the temperature gradients in the column, the less is the cleaning out required and the greater the yield. As already noted cleaning out takes place to some extent in zone C of the column. In the chamber and in line with the tubular reaction chamber is shown valved burner pipe 22 with a sort of damper arrangement 23. When sufficient gas is furnished in cleaning out, 22 is used to introduce a jet of air and form flame; 23 being then closed. With less gas, gas from another source, such as scrubbed gas from the carbonizer, may enter at 22, pulling in air through 23 by an injector action. In the operation of the apparatus shown, presuming fruit pits are to be used as a source of activated carbon, the raw material is fed in by means of 7. With the reciprocation of 4 successive charges are forced into reaction chamber 1 and establish therein a moving column of material, this material moving forward until it drops at 11 into chamber 12. Against the end face of the material I project flame and flame gases from 22—23 and ordinarily produce suction on pipe 8. The flame gases heat face 11 to a high temperature but as they pass inward through the carbonized material their temperature is dropped by the endothermic reduction of $CO_2$ and $H_2O$. There is a sharp temperature gradient beyond 11 to the right. Beyond this point the temperature gradient is more gradual. Going now to the other end of the apparatus the material fed in through 7 usually contains more or less moisture and more usually collects from condensation of $H_2O$ in the gases coming through the carbonization zone. Moist material at the feed end cannot be above a temperature of 212°. As the material is pushed to the left it is gradually dried and heated by the gases coming in countercurrent. At some point in its progress the temperature becomes high enough for the stated exothermic carbonization reaction to set in. In the drawing I have marked this zone as B. In the carbonization zone the material breaks up with liberation of gases and vapors which at once move away from the material, going to the right and cooling off while the carbonized material goes to the left and becomes hotter. The material passing away at 11 is completely carbonized and is almost free of volatilizable bodies. It does not contain much, if any, secondary carbon. The material, however, usually needs some cleaning out and this is given it in 12. The material dropping from face 11 forms a pervious bed or mass at a high temperature. The top of chamber 12 may be domed to aid heat radiation downward. Through the accumulation of material resting on the grate in chamber 12 I may blow products of combustion or steam or both. If the temperature tends to drop too much by reason of endothermic actions that is if much "cleaning out" is done, I may add further heat by air from 18. Passing through the grate the material is cooled and quenched by water from valved pipe 24. Steam formed in the quenching goes up through the mass and aids in the cleaning out operation. The material dropping through star wheel 15 into chamber 16 is further quenched if necessary by water. After cooling it may be extracted with acid etc. and otherwise treated in the ways common in making activated carbon.

While I have spoken more specifically of fruit pits, the present process may be as well employed with any of the other materials from which activated carbon is customarily made, such as lignite, sawdust, bark, straw, etc. The raw material may, as often the case, be admixed with calcium carbonate, dolomite, etc. Where this admixture is made the actions are exactly the same save that the endothermic production of $CO_2$ tends to take up heat in the carbonizing zone and may make it run somewhat cooler and be somewhat longer in extent. Where these admixtures are used they are again extracted by an acid wash after the removal of the carbon from cooling pit 16. Removal is effected by conveyor 25.

Whatever the material used, the apparatus shown once put into operation is almost automatic in its action. When carbonizing zone B is established it tends to persist as long as the feed of raw material and flame gases continues and it does not ordinarily shift its location to any great extent in either direction. The flame directed against the discharge face of material coming from C should be run reducing; that is there should be an insufficient supply of air for complete combustion. The flame gases passing through C become more reducing by virtue of the water gas reaction mentioned. This reaction aids materially in producing the stable temperature gradients in the advancing column.

Apparatus of the general type of that illustrated is described and claimed in my copending application, Serial No. 31,148 and I make no claim for apparatus herein.

While I have shown and described but one carbonizing apparatus feeding the clean-out chamber it is obvious there may be several such carbonizers operating in parallel and discharging into a common clean out chamber. In securing a given capacity, it is best to vary the size of the clean out chamber and the number of carbonizing chambers discharging into it. With a plurality of carbonizing chambers operating in parallel there should be a corresponding plurality of flame producing means in alignment. With suction used for draft, individual control of the carbonizing chambers may be effected by the use of proper valves beyond 8.

As stated, some cleaning-out takes place in zone C and since conditions are so controlled as to preclude formation of secondary carbon to any great extent in zones B and C, not much cleaning out is necessary in any event. Often chamber 12 has but little work to do; not much oxidation is there necessary. Much of course depends on the nature of the material carbonized. However it is generally expedient to subject the material coming from face 11 to the action of mildly oxidizing draft currents in 12.

What I claim is:—

1. The process of making activated carbon which comprises establishing and maintaining a relatively short moving pervious column of material to be carbonized with one end at a relatively low temperature, projecting a current of hot flame gases against the other end and producing a movement of such gases through such column in countercurrent whereby a stationary zone of carbonization is established and maintained and subjecting hot carbonized material emerging at such other end to partial oxidation by another draft current.

2. The process of making activated carbon which comprises establishing and maintaining a relating short moving horizontal pervious column of material to be carbonized with one end at a relatively low temperature, projecting a current of hot flame gases against the other end and producing a movement of such gases through such column in countercurrent whereby a stationary zone of carbonization is established and maintained and subjecting hot carbonized material emerging at such other end to partial oxidation by another draft current.

3. The process of making activated carbon which comprises supplying material to be carbonized to a short reaction chamber in the nature of a conduit and having a temperature at the point of supply not over 212° F., moving such material laterally along the conduit as a full-area prism to a point of exit, projecting flame gases against the face of the emerging material while removing gases, vapors and condensed liquids at the other end and subjecting the emerging hot material to the action of another draft current having mild oxidizing properties.

4. The process of making activated carbon which comprises supplying material to be carbonized to a short reaction chamber and moving the same therethrough as a travelling body with the feed end at a relatively low temperature and impinging against the discharge end a flame of reducing nature whereby an intermediate relatively stationary zone of carbonization is established and maintained.

5. The process of making activated carbon which comprises establishing and maintaining a stationary zone of carbonization in a moving pervious prism of carbonizable material with the supply end at a lower temperature, sweeping evolved gases and vapors toward the cooler end as fast as formed and impinging a gas flame of reducing nature on the other end to supply heat and to furnish flame gases to effect such sweeping.

In testimony whereof, I have hereunto affixed my signature.

GEORGE W. WALLACE.